United States Patent [19]

Leinenger

[11] 4,381,834
[45] May 3, 1983

[54] MODULAR CHUTING

[75] Inventor: John T. Leinenger, Pontiac, Mich.

[73] Assignee: Modular Automation, Inc., Clarkston, Mich.

[21] Appl. No.: 265,664

[22] Filed: May 20, 1981

[51] Int. Cl.³ .................. B65G 11/16; B65G 13/00
[52] U.S. Cl. .......................... 193/35 J; 193/2 A; 193/35 R; 193/38
[58] Field of Search ......... 193/2 R, 2 A, 2 C, 25 FT, 193/35 R, 35 C, 35 J, 38, 41; 198/836; 156/91, 304.1, 304.2, 304.3

[56] References Cited

U.S. PATENT DOCUMENTS

| 424,271 | 3/1890 | Chapman. |
| 790,776 | 5/1905 | Alvey. |
| 971,087 | 9/1910 | Smith. |
| 1,013,292 | 1/1912 | Goehr. |
| 1,252,616 | 1/1918 | Reif. |
| 1,256,724 | 2/1918 | Pardee. |
| 1,720,843 | 7/1929 | Lee. |
| 1,802,089 | 4/1931 | Pfeiffer. |
| 2,218,444 | 10/1940 | Vineyard. |
| 2,284,488 | 5/1942 | Johnson. |
| 2,717,071 | 9/1955 | Cook .............................. 193/35 R X |
| 3,343,793 | 9/1967 | Waser. |
| 3,389,771 | 6/1968 | Sanders .............................. 193/38 X |
| 3,491,873 | 1/1970 | Fauth .................................. 198/836 |
| 3,837,452 | 9/1974 | Schuricht. |
| 3,915,275 | 10/1975 | Specht .............................. 193/35 R |
| 4,198,043 | 4/1980 | Timbes et al. . |

FOREIGN PATENT DOCUMENTS 2713223 10/1977 Fed. Rep. of Germany ........ 193/38

Primary Examiner—Jeffrey V. Nase
Attorney, Agent, or Firm—Basile, Weintraub & Hanlon

[57] ABSTRACT

A modular chute for passing a workpiece therealong is disclosed. The chute of the present invention includes a U-shaped cross-section having a bottom wall, a pair of opposed side walls, and an open top. A joining device is provided for abutting and securing a plurality of chutes into a continuous member. Wear members are disclosed that are selectively secured to the walls of the chute to reduce friction and wear from parts moving along the chute.

8 Claims, 10 Drawing Figures

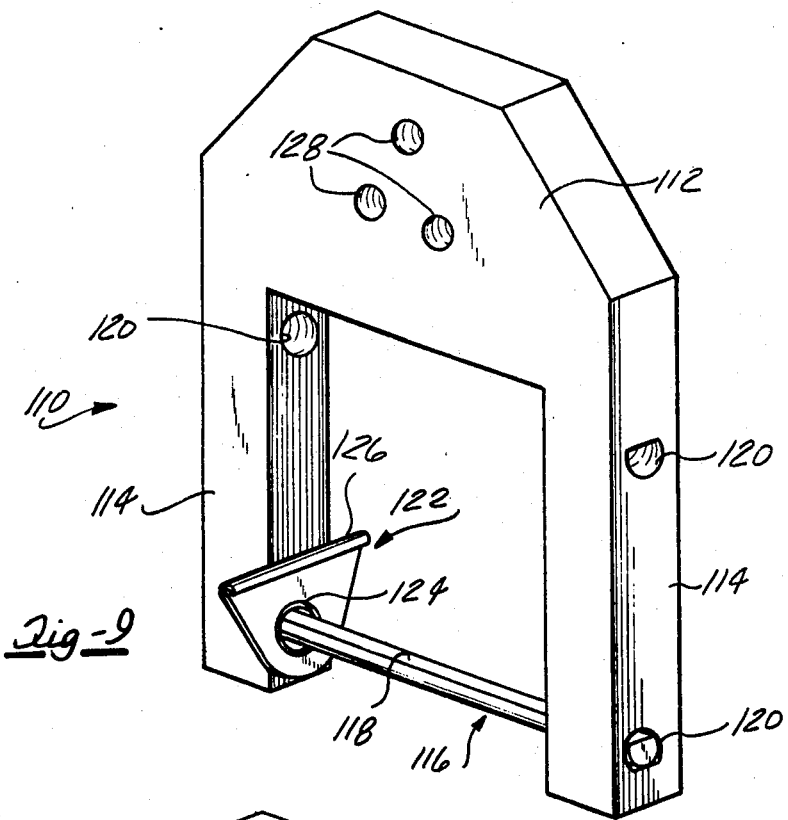
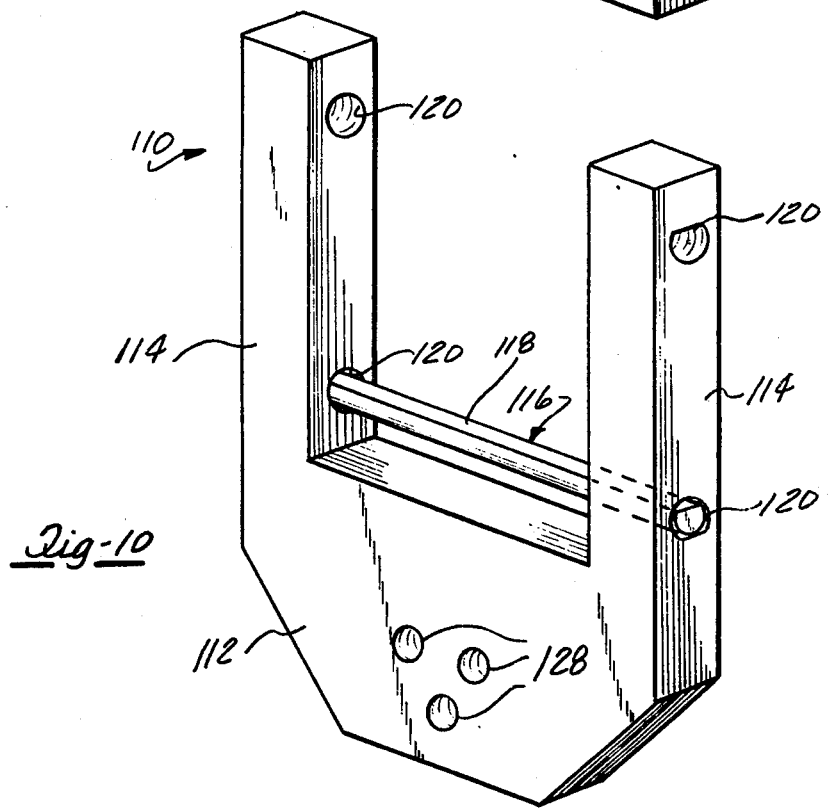

MODULAR CHUTING

BACKGROUND OF THE INVENTION

I. Field of the Invention

The present invention generally relates to material handling devices and, in particular, the present invention is concerned with modular chuting for moving workpieces from one place to another under gravity and along the chute.

II. Description of the Prior Art

Chutes, both linear and curved, for conveying parts from one location to another are well known in the art. A variety of methods have been proposed for joining and supporting chutes as well as for providing chutes with projections along their inside walls to aid in part conveyance. Examples of chutes and chute systems in the prior art are disclosed in U.S. Pat. No. 1,252,616; U.S. Pat. No. 971,087; U.S. Pat. No. 2,218,444; U.S. Pat. No. 2,284,488; and U.S. Pat. No. 4,198,043. Examples of chutes and chuting systems having a non-linear form are disclosed in U.S. Pat. No. 424,271; U.S. Pat. No. 790,776; U.S. Pat. No. 1,013,292; U.S. Pat. No. 1,256,724; U.S. Pat. No. 1,720,843; U.S. Pat. No. 1,802,089; U.S. Pat. No. 3,343,793; and U.S. Pat. No. 3,837,452. These patents are relevant to the Applicant's invention in that they represent the closest prior art for utilizing chutes to convey parts from one location to another under gravity. They do not, however, disclose or anticipate the device of the present invention for joining lengths of chute together to form a liquid-tight joint. None of the above-listed U.S. Patents disclose nor anticipate the use of grooves or recesses formed along the walls of the chute to receive wear-resistant inserts to aid in the movement of workpieces along the chute as disclosed in the present invention.

III. Prior Art Statement

The aforementioned prior art, in the opinion of the Applicant and the Applicant's attorneys, represents the closest prior art of which the Applicant and his attorneys are aware.

SUMMARY OF THE INVENTION

The present invention, which will be described in greater detail hereinafter, comprises a modular chute for passing a workpiece therealong which includes a plurality of lengths of chute having a U-shaped cross-section with a bottom wall, an opposed pair of side walls, and an open top. A joining device is provided for abutting and securing a plurality of chutes into a continuous series of members with a leak-proof joint. Grooves of recesses formed along inside walls of the chute are utilized to selectively attach a variety of wear-resistant members to the walls of the chute to minimize wear and to assist in the movement of the workpieces along the chute.

The device for joining lengths of chute comprises a U-shaped coupling member with a bottom wall and a pair of opposed, upright walls integral with the bottom wall. The upright walls include an upper edge having a projecting bead. A pair of opposed grooves formed along the opposed side walls of the chute are aligned with and snugly receive the bead to secure the U-shaped coupling member to the chute. In the preferred embodiment an adhesive is used to bond the chute ends, one to the other, and to secure the U-shaped coupling member to the chute.

It is therefore a primary object of the present invention to provide a new and improved modular chute system.

It is a further object of the present invention to provide a modular chute system which may be readily joined into a continuous piece.

It is yet another object of the present invention to provide grooves and recesses along the inside walls of the chute to selectively attach wear-resistant members which aid in the movement of workpieces along the chute.

It is another object of the present invention to provide anti-friction bearings and bearing supports that may be selectively attached to the walls of the chute to reduce wear and friction.

It is yet another object of the present invention to provide an improved chute system which may be readily and inexpensively installed.

Further objects, advantages and applications of the present invention will become apparent to those skilled in the art of conveyors and chute systems when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numbers refer to like parts throughout the various views, and wherein:

FIG. 3 illustrates a partial cross-sectional view of a wear-reducing element engageable with a dovetail joint of FIG. 2;

FIG. 4 illustrates an alternate embodiment of a wear-reducing element engageable with the dovetail groove of FIG. 2;

FIG. 9 illustrates a perspective view of a support bracket for supporting the chute from overhead; and FIG. 10 illustrates a perspective view of the support bracket of FIG. 9 deployed to support the chute from the ground.

DESCRIPTION OF THE PREFERRED EMBODIMENT

Figure 1:
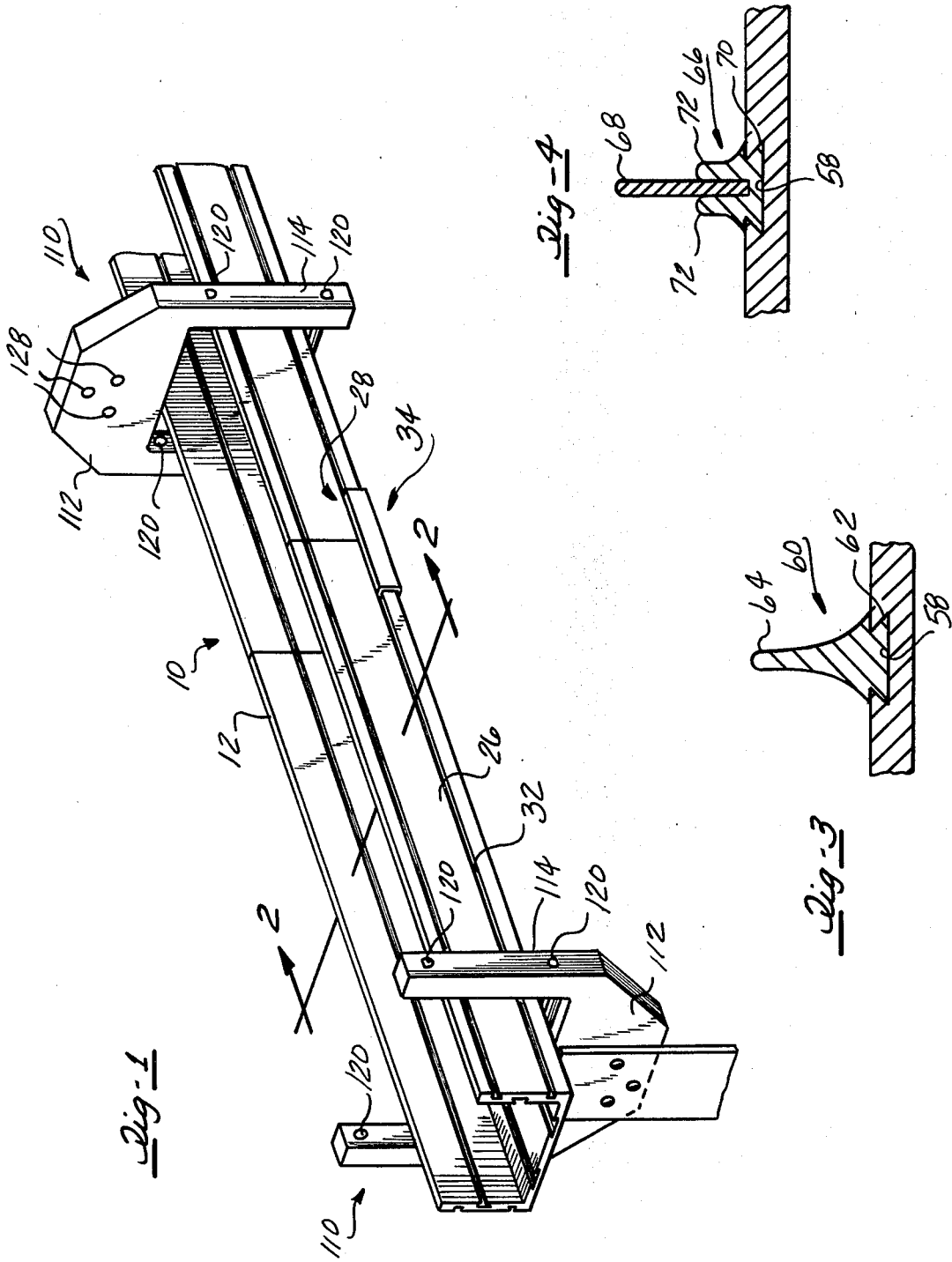
FIG. 1 illustrates a broken, perspective view of the chuting system of the present invention.
Figure 2:
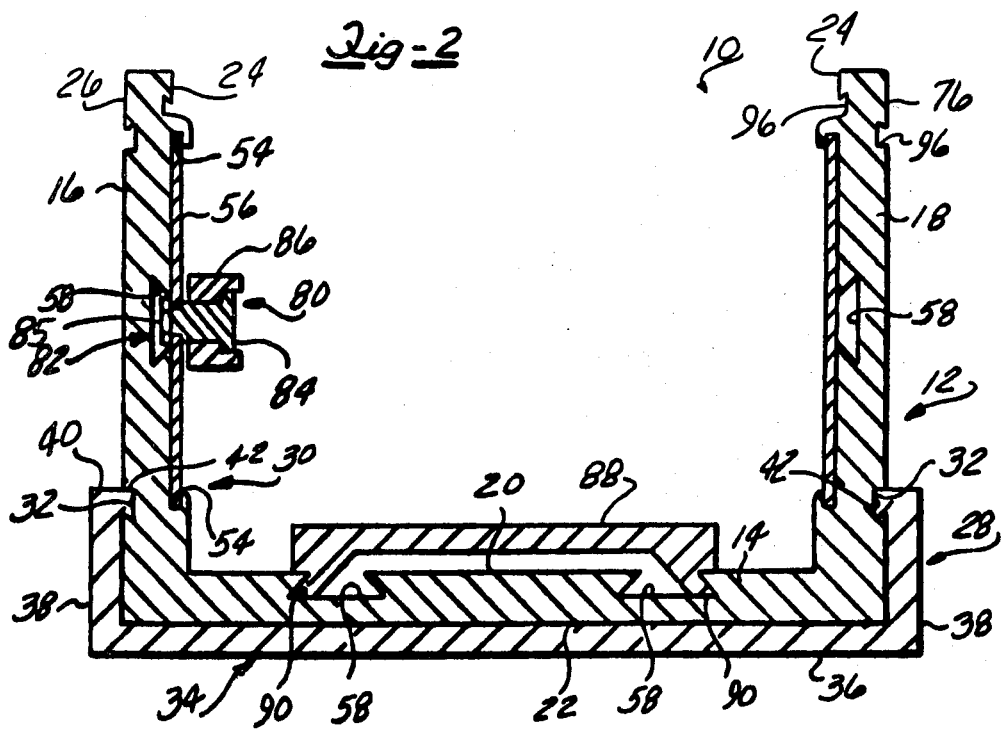
FIG. 2 illustrates a cross-sectional view of the chute taken along line 2—2 of FIG. 1.

Referring now to the drawing, there is illustrated in FIG. 1 one example of the present invention in the form of a chute assembly 10. As shown in FIG. 2, the chute assembly 10 includes a chute 12 having a U-shaped cross-section including a bottom wall 14, a pair of opposed side walls 16,18 formed into a unitary structure. The bottom wall 14 includes an inside surface 20 and an outside surface 22, and each opposed side wall 16,18 includes an inside surface 24 and an opposed side wall outside surface 26. A joining means 28 is provided for abutting and securing a plurality of chutes 12 into a continuous member. A means 30 is provided for securing a wear-resistant member to the walls of the chute. The means 28 and 30 will be discussed in greater detail hereinbelow.

Figure 5:
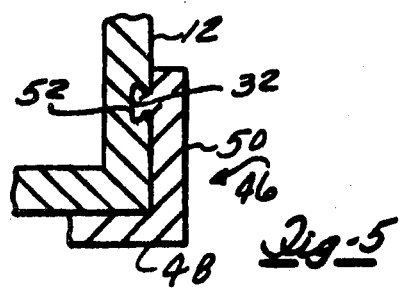
FIG. 5 illustrates an alternate embodiment of a joining device for joining lengths of chute together.
Figure 6:
FIG. 6 illustrates a cross-section view of an additional embodiment of a method for joining lengths of chute together.

Referring now to FIGS. 1 and 2 of the drawing, the means 28 for joining lengths of chute 12 comprises a pair of opposed grooves 32 formed longitudinally along the outside wall surface 26, and a U-shaped coupling member 34 comprising a coupling bottom wall 36 and a pair of opposed upright walls 38 integral with the bottom wall 36 formed into an integral member. The upright walls 38 include an upper edge 40 along which is formed a bead 42 which is snugly engageable with the opposed grooves 32 to secure the coupling member 34 to the chute 12. In a preferred embodiment, a pair of chutes 12 with abutting ends are first covered along their abutting ends with adhesive and the coupling member 34 is applied abutting the outside surfaces 22,26 with adhesive applied between the abutting surfaces. This forms a continuous member with smooth, continuous inside surfaces to allow smooth sliding of workpieces along the chute. As shown in FIG. 6 of the drawing, a joining bead 44 may be employed to snugly engage the groove 32 and hold lengths of chute in an aligned position. In utilizing the joining bead 44, the abutting ends are covered with adhesive and aligned and held in abutment until the adhesive sets to form a smooth, continuous joint. If good alignment and abutment is not possible between adjoining chutes 12, it is recommended that the coupling member 34 be employed to affect the joint rather than the use of the joining bead 44. In another embodiment illustrated in FIG. 5, an L-shaped joining bead 46 may be employed. The L-shaped joining bead 46 includes a bead bottom wall 48 and a bead vertical wall 50 abutting the outside surfaces of the chute 12. A projection 52 snugly engages the opposed groove 32 to hold the abutting pieces of conduit 12 in alignment. It is preferable to wet the abutting surfaces with adhesive prior to joining them together. The L-shaped joining bead is employed to hold the abutting lengths of conduit 12 in abutment and alignment until the adhesive forms a bond to produce a liquid-tight, smooth, permanent joint for moving workpieces therealong.

As is illustrated in FIG. 2 of the drawing, the means 30 for securing a wear-resistant member to the walls of the chute comprises a pair of spaced-apart, opposed recesses 54 formed longitudinally along an inside surface of the chute 12, and a wear-resistant member 56 such as a hardened steel plate or abrasion-resistant plastic piece snugly retained between the recesses 54.

As illustrated in FIGS. 2, 3 and 4 of the drawing, a second embodiment of the means 30 for securing a wear-resistant member to the walls of the chute comprises a plurality of dovetail grooves 58 formed longitudinally along the inside walls of the chute 12. The dovetail grooves 58 are configured to snugly retain a variety of wear-resistant members as shown in FIGS. 3 and 4. The wear-resistant member illustrated in FIG. 3 comprises an insert 60 having a first end 62 with a complementary form to snugly engage the dovetail groove 58 and an inward projecting second end 64 to abut and support the workpiece. The insert 60 may be made from wear-resistant steel or plastic, depending upon the workpiece to be supported. Also, anti-friction materials such as bonded graphite fibers, teflon or teflon-coated steel may be used.

FIG. 4 of the drawing illustrates a support 66 for a wear-resistant insert 68. The support 66 includes a lower end 70 snugly engageable with the dovetail 58 and a pair of upward extending legs 72 to snugly retain the wear-resistant insert 68.

Figure 7:
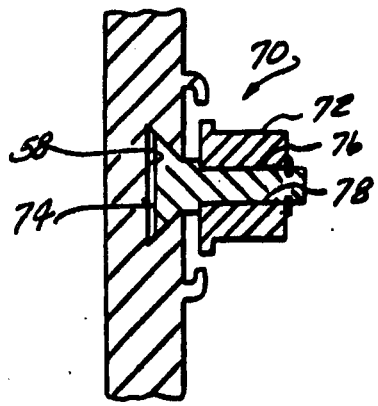
FIG. 7 illustrates a bearing support and an anti-friction bearing engageable with a dovetail groove.

Referring now to FIG. 7 of the drawing, there is illustrated a bearing support 70 for supporting a roller bearing 72. The bearing support 70 comprises a dovetail end 74 snugly engaging the dovetail groove 58 and an inward projecting rod end 76 to rotatingly support the roller bearing 72 along a bearing bore 78.

Referring again to FIG. 2 of the drawing, there is illustrated at 80 an additional means for securing a wear-resistant member to the walls of the chute comprising a plurality of spaced apertures 82 formed along the wear-resistant member 56, a rod 84 engaging each aperture 82, a thread formed on one end of the rod 84 with a nut 85 engaging the thread to secure the rod to the member 56. A bearing 86 is rotatably supported by the rod 84 and provides a support for the workpiece.

Also shown in FIG. 2 of the drawing is a flat, wear-resistant plate 88 secured to the inside wall of the chute 12 by a pair of spaced dovetails 58. A pair of projections 90 formed along the flat plate 88 abut the dovetails 58 to secure the plate 88 to the wall of the chute 12.

Figure 8:
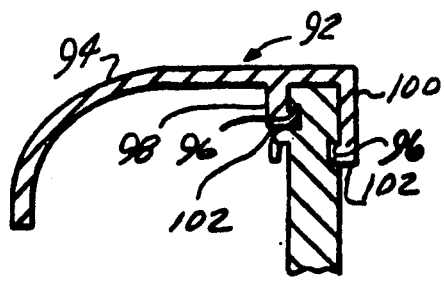
FIG. 8 illustrates a cross-sectional view of a part retainer engageable with an upper edge of the chute.

It is often desirable to partially cover the open top of the chute with a part retainer to prevent parts from falling out of the chute when a jam-up occurs. FIG. 8 of the drawing illustrates a part retainer 92 having a top wall 94 overlaying the open top. A pair of upper grooves 96 formed along the pair of opposed side walls 16,18 proximate the open top are utilized to retain the part retainer 92 to the side walls. A pair of downward extending legs 98,100 include a hook-like projection 102 at a lower end thereof to snugly engage the upper grooves 96 and retain the part retainer 92 to the side wall.

As shown in FIGS. 1, 9 and 10 of the drawing, a support bracket 110 is provided which can support the chute 12 from either below the chute or above the chute. The bracket 110 comprises a transverse member 112 and a pair of projecting legs 114 spaced to straddle the trough 12 therebetween. A dowel 116 with a flat side 118 extends between legs 114 and is supported by apertures 120 formed in the projecting legs 114. The dowel 116 is allowed to rotate within the aperture 120 once it is in place so that the flat side of the dowel can abut the bottom wall outside surface 22. A pair of retaining clips 122 are slidingly retained by the dowel 116. Each clip 122 includes an aperture 124 to slidingly engage the dowel 116 and an upper bead 126 to snugly engage the opposed grooves 32, securing the bracket 110 to the chute 12. As shown in FIG. 1 of the drawing, the brackets 110 can support the trough 12 from either above or below. A plurality of apertures are utilized to secure the bracket 110 to a suspension rod or a post providing the support for the bracket 110, which in turn supports the chute 12.

It can thus be seen that the present invention has provided a new and improved modular chute for passing a workpiece therealong. It is obvious to the skilled artisan that the chute can be made from a variety of materials including extruded aluminum, plastic, etc. It is contemplated that the chute can be made economically from PVC plastic, although the teachings of the invention are not limited to this material.

It should be understood by those skilled in the art of modular chutes that other forms of the Applicant's invention may be had, all coming within the spirit of the invention and the scope of the appended claims.

Having thus described my invention, what I claim is:

1. In a modular chute for passing a workpiece therealong comprising:
   a chute having a U-shaped cross-section including a bottom wall with an inside surface and an outside surface, a pair of opposed side walls with an inside surface and an outside surface, and an open top;
   a joining means for abutting and securing a plurality of chutes into a liquid tight continuous member;
   means for securing a wear-resistant member to the walls of the chute;
   means for aligning said plurality of chutes; and
   an adhesive for securing said plurality of chutes one to another; the improvement wherein said joining means comprises:
   a pair of opposed grooves formed in the opposed side walls disposed longitudinally along the side wall outside surface;
   a U-shaped coupling member comprising a coupling bottom wall and a pair of opposed upright walls integral with the coupling bottom wall, said upright walls including an upper edge, a bead snugly engageable with said opposed grooves formed along the upper edge; and
   whereby a pair of chutes with abutting ends are secured at the abutting ends to form a continuous member with said coupling member abutting said outside surfaces of said chute bottom wall and opposed side walls.

2. The modular chute of claim 1 wherein the means for securing a wear-resistant member to the walls of the chute comprises:
   a pair of spaced-apart, opposed recesses formed longitudinally along an inside surface of said walls, each recess including a downward extending and an upward extending portion; and
   a wear-resistant member snugly retained between the downward extending and upward extending portions of said opposed recesses.

3. The modular chute of claim 2 further comprising:
   a plurality of spaced apertures formed along said wear-resistant member;
   a rod engaging each aperture, a thread formed on one end of said rod with a nut engaging the thread to secure said rod to said wear-resistant member; and
   a bearing rotatingly supported by said rod whereby the workpiece is supported by said bearing.

4. The modular chute of claim 1 further comprising a part retainer which comprises:
   a pair of longitudinal grooves formed along each opposed side wall proximate the open top, a groove along each inside wall and outside wall;
   a part retainer overlaying one of said opposed side walls and a portion of the open top, said retainer including a pair of legs straddling said opposed side wall, said legs extending downward covering said longitudinal grooves, each leg including a projection at a lower end thereof to snugly engage said longitudinal grooves and secure said part retainer to said opposed side wall.

5. In a modular chute for passing a workpiece therealong comprising:
   a chute having a U-shaped cross-section including a bottom wall with an inside surface and an outside surface, a pair of opposed side walls with an inside surface and an outside surface, and an open top;
   a joining means for abutting and securing a plurality of chutes into a liquid tight continuous member;
   means for securing a wear-resistant member to the walls of the chute;
   means for aligning said plurality of chutes; and
   an adhesive for securing said plurality of chutes one to another; the improvement wherein said joining means comprises:
   said plurality of chutes having abutting and aligned ends;
   a pair of aligned non piercing grooves formed in and longitudinally along the side wall outside surface; and
   a longitudinal bead extending between chutes snugly engaging each of the aligned pairs of grooves, and adhesive placed along the abutting ends and bead to form a continuous member.

6. In a modular chute for passing a workpiece therealong comprising:
   a chute having a U-shaped cross-section including a bottom wall with an inside surface and an outside surface, a pair of opposed side walls with an inside surface and an outside surface, and an open top;
   a joining means for abutting and securing a plurality of chutes into a liquid tight continuous member;
   means for securing a wear-resistant member to the walls of the chute;
   means for aligning said plurality of chutes; and
   an adhesive for securing said plurality of chutes one to another; the improvement wherein said means for securing a wear-resistant member to the walls of the chute comprises:
   a dovetail groove formed longitudinally along an inside surface;
   a wear-resistant member having a first end with a complementary form to engage the dovetail and an inward projecting rod integral with the first end, a roller bearing rotatingly supported by said rod; and
   wherein the roller bearing supports the workpiece for movement along said chute.

7. In a modular chute for passing a workpiece therealong comprising:
   a chute having a U-shaped cross-section including a bottom wall with an inside surface and an outside surface, a pair of opposed side walls with an inside surface and an outside surface, and an open top;
   a joining means for abutting and securing a plurality of chutes into a liquid tight continuous member;
   means for securing a wear-resistant member to the walls of the chute;
   means for aligning said plurality of chutes; and
   an adhesive for securing said plurality of chutes one to another; the improvement wherein said means for securing a wear-resistant member to the walls of the chute comprises:
   a dovetail groove formed in said side walls longitudinally along an inside surface;
   a bearing support having a dovetail end snugly engaging the dovetail groove, and a rod end;
   a roller bearing having a bore slidingly engaging said rod end and rotatingly supported by said rod end; and
   a groove formed at an inside end of said rod end, and a retaining means snugly engaging said groove to retain said roller bearing.

8. In a modular chute for passing a workpiece therealong comprising a chute having a U-shaped cross-section including a bottom wall with an inside surface and an outside surface, a pair of opposed side walls and an open top, a joining means for securing a plurality of successive chutes into a continuous member, means for securing a wear resistant member to the pair of opposed side walls, the improvement wherein said means for securing a wear resistant member to the opposed side walls comprises:

a recess formed longitudinally along an inside surface of said opposed side walls, each recess including a downward extending finger and an upward extending finger; and a flat plate member snugly retained between said downward extending finger and upward extending finger.

* * * * *